US007448947B2

(12) United States Patent
Englman et al.

(10) Patent No.: US 7,448,947 B2
(45) Date of Patent: Nov. 11, 2008

(54) METHOD OF CONDUCTING A POKER GAME

(75) Inventors: Allon G. Englman, Chicago, IL (US); Jeremy M. Hornik, Chicago, IL (US); Michael W. Mastropietro, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 410 days.

(21) Appl. No.: 11/157,536

(22) Filed: Jun. 21, 2005

(65) Prior Publication Data

US 2005/0282605 A1 Dec. 22, 2005

Related U.S. Application Data

(60) Provisional application No. 60/582,108, filed on Jun. 22, 2004.

(51) Int. Cl.
*G06F 17/00* (2006.01)

(52) U.S. Cl. .................................................. 463/13

(58) Field of Classification Search .................... 463/13
See application file for complete search history.

(56) References Cited

U.S. PATENT DOCUMENTS 4,743,022 A 5/1988 Wood .................... 273/85 CP
5,294,120 A 3/1994 Schultz .................. 273/85 CP
5,308,065 A 5/1994 Bridgeman et al. ..... 273/85 CP
5,322,295 A 6/1994 Cabot et al. ................ 273/292
5,382,025 A * 1/1995 Sklansky et al. ........... 273/292
5,401,023 A 3/1995 Wood
5,431,408 A 7/1995 Adams ...................... 273/306
5,437,451 A 8/1995 Fulton .................... 273/138 A
5,489,101 A 2/1996 Moody
5,511,781 A 4/1996 Wood et al.
5,531,448 A 7/1996 Moody
5,732,950 A 3/1998 Moody
5,816,916 A 10/1998 Moody
5,823,873 A 10/1998 Moody
5,868,619 A 2/1999 Wood et al.
5,882,259 A 3/1999 Holmes, Jr.
5,954,335 A 9/1999 Moody
5,957,774 A 9/1999 Holmes, Jr. et al.
5,976,016 A 11/1999 Moody et al.
6,007,066 A 12/1999 Moody (Continued)

FOREIGN PATENT DOCUMENTS

WO WO 97/27570 7/1997

OTHER PUBLICATIONS

Draw Poker Variants, web page (6 pages).

*Primary Examiner*—Robert E Pezzuto
*Assistant Examiner*—Manjot K Dhillon
(74) *Attorney, Agent, or Firm*—Nixon Peabody LLP

(57) ABSTRACT

According to one embodiment of the present invention, a method of conducting a wagering game is disclosed. The method comprises revealing a plurality of symbol-bearing objects to form a plurality of user-playable hands. At least one hand from the plurality of user-playable hands is discarded, via player selection. A first plurality of community symbol-bearing objects is revealed. The plurality of community symbol-bearing objects is capable of being combined with one or more of the non-discarded plurality of user-playable hands to form an individual best hand.

21 Claims, 9 Drawing Sheets

U.S. PATENT DOCUMENTS

| | | | | |
|---|---|---|---|---|
| 6,012,720 | A | 1/2000 | Webb | |
| 6,045,129 | A | 4/2000 | Cooper et al. | |
| 6,098,985 | A | 8/2000 | Moody | 273/292 |
| 6,110,040 | A | 8/2000 | Sanduski et al. | 463/13 |
| 6,120,378 | A | 9/2000 | Moody et al. | |
| 6,132,311 | A | 10/2000 | Williams | 463/13 |
| 6,149,521 | A | 11/2000 | Sanduski | 463/13 |
| 6,206,780 | B1 | 3/2001 | Awada | 463/13 |
| 6,248,016 | B1 | 6/2001 | Walker et al. | 463/13 |
| 6,257,979 | B1 | 7/2001 | Walker et al. | 463/13 |
| 6,336,860 | B1 | 1/2002 | Webb | |
| 6,416,407 | B1 | 7/2002 | Carrico et al. | |
| 6,461,240 | B1 | 10/2002 | Perkins | |
| 6,471,587 | B1 | 10/2002 | Wood et al. | 463/13 |
| 6,474,645 | B2 | 11/2002 | Tarantino | 273/274 |
| 6,494,454 | B2 | 12/2002 | Adams | 273/292 |
| 6,561,898 | B2 | 5/2003 | Moody | 463/13 |
| 6,569,013 | B1 | 5/2003 | Taylor | |
| 6,569,014 | B2 | 5/2003 | Walker et al. | 463/13 |
| 6,595,520 | B1 | 7/2003 | Richards et al. | |
| 6,595,852 | B2 | 7/2003 | Wang | 463/13 |
| 6,612,926 | B1 | 9/2003 | Dabrowski | |
| 6,612,927 | B1 | 9/2003 | Slomiany et al. | |
| 6,616,142 | B2 | 9/2003 | Adams | 273/292 |
| 6,637,747 | B1 | 10/2003 | Garrod | 273/292 |
| 6,672,958 | B2 | 1/2004 | Bennett | 463/13 |
| 6,708,975 | B1 | 3/2004 | Fox et al. | |
| 6,726,427 | B2 | 4/2004 | Jarvis et al. | 413/12 |
| 6,780,106 | B2 | 8/2004 | DeMar et al. | |
| 6,857,957 | B2 | 2/2005 | Marks et al. | |
| 2002/0034974 | A1 | 3/2002 | Wood et al. | |
| 2002/0169015 | A1 | 11/2002 | Moody | 463/13 |
| 2002/0185816 | A1 | 12/2002 | Moody et al. | 273/292 |
| 2003/0032469 | A1 | 2/2003 | Moody et al. | 463/13 |
| 2003/0038425 | A1 | 2/2003 | Tarantino | 273/274 |
| 2003/0064773 | A1 | 4/2003 | Baerloucher et al. | |
| 2003/0119572 | A1 | 6/2003 | Moody et al. | 463/13 |
| 2003/0153377 | A1 | 8/2003 | Lisowski, Sr. | |
| 2003/0166411 | A1 | 9/2003 | Moody | 463/13 |
| 2003/0181232 | A1 | 9/2003 | Peccola, Jr. | |
| 2003/0186733 | A1 | 10/2003 | Wolf et al. | 463/16 |
| 2003/0189290 | A1 | 10/2003 | Moody | 273/292 |
| 2003/0214097 | A1 | 11/2003 | Moody | 273/292 |
| 2004/0043807 | A1 | 3/2004 | Pennington | |
| 2004/0132524 | A1 | 7/2004 | Ramstad et al. | |
| 2004/0248641 | A1 | 12/2004 | Jarvis et al. | |

* cited by examiner

METHOD OF CONDUCTING A POKER GAME

CROSS REFERENCE TO RELATED APPLICATION

This application claims the benefit of priority of U.S. Provisional Patent Application No. 60/582,108, filed Jun. 22, 2004, which is hereby incorporated by reference in its entirety.

FIELD OF THE INVENTION

The present invention relates generally to wagering games and, more particularly, to a poker game having a plurality of user-selectable hands.

BACKGROUND OF THE INVENTION

Gaming terminals, such as slot machines, video poker machines and the like, have been a cornerstone of the gaming industry for many years. Generally, the popularity of such machines with players is dependent on the likelihood (or perceived likelihood) of winning money at the gaming terminal and the intrinsic entertainment value of the machine relative to other available gaming options. Where the available gaming options include a number of competing machines and the expectation of winning on each machine is roughly the same (or believed to be the same), players are most likely to be attracted to the most entertaining and exciting machines. Shrewd operators constantly strive to employ the most entertaining and exciting machines available, because such machines attract frequent play and hence increase profitability to the operator.

Video poker machines have been used in gaming establishments for many years. Manufacturers strive to increase the number of coins or credits wagered when a casino patron uses the machine. Manufactures also strive to develop variations to conventional video poker machines to lure casino patrons to their machines. As casino patrons become bored with these nominal variations of conventional video poker, gaming establishments are continually looking for new video poker games that will attract frequent play and hence increase profitability to the gaming establishment. Over the past few years, casino patrons have become increasingly enthralled with a version of poker known as Texas Hold 'Em.

SUMMARY OF THE INVENTION

According to one embodiment of the present invention, a method of conducting a wagering game is disclosed. The method comprises providing a plurality of cards to form a plurality of user-playable hands. The method further comprises discarding, via player selection, at least one of the plurality of user-playable hands to create a reduced plurality of user-playable hands. The method further comprises providing a plurality of community cards and discarding, via player selection, at least a second one of the plurality of user-playable hands to create a further-reduced plurality of user-playable hands. Each of the further-reduced plurality of user-playable hands is capable of being combined with the plurality of community cards to form a plurality of individual best hands.

According to another embodiment of the present invention, a method of conducting a wagering game is disclosed. The method comprises revealing a plurality of symbol-bearing objects to form a plurality of user-playable hands. The method further comprises discarding, via player selection, at least one hand from the plurality of user-playable hands. The method further comprises revealing a first plurality of community symbol-bearing objects. The plurality of community symbol-bearing objects is capable of being combined with one or more of the non-discarded plurality of user-playable hands to form an individual best hand.

According to yet another embodiment of the present invention, a gaming terminal capable of conducting a wagering game is disclosed. The gaming terminal comprises one or more displays, an input device, and a controller. The one or more displays display a plurality of symbol-bearing objects to form a plurality of user-playable hands. The one or more displays also display a plurality of community symbol-bearing objects. The plurality of community symbol-bearing objects is capable of being combined with each of the user-playable hands. The input device allows a player to select at least one of the displayed plurality of user-playable hands to discard. The unselected user-playable hands form a reduced plurality of user-playable hands. The controller is operative to form individual best hands by combining the plurality of community symbol-bearing objects with each of the reduced plurality of user-playable hands.

The above summary of the present invention is not intended to represent each embodiment, or every aspect, of the present invention. Additional features and benefits of the present invention are apparent from the detailed description, figures, and claims set forth below.

Figure 1:
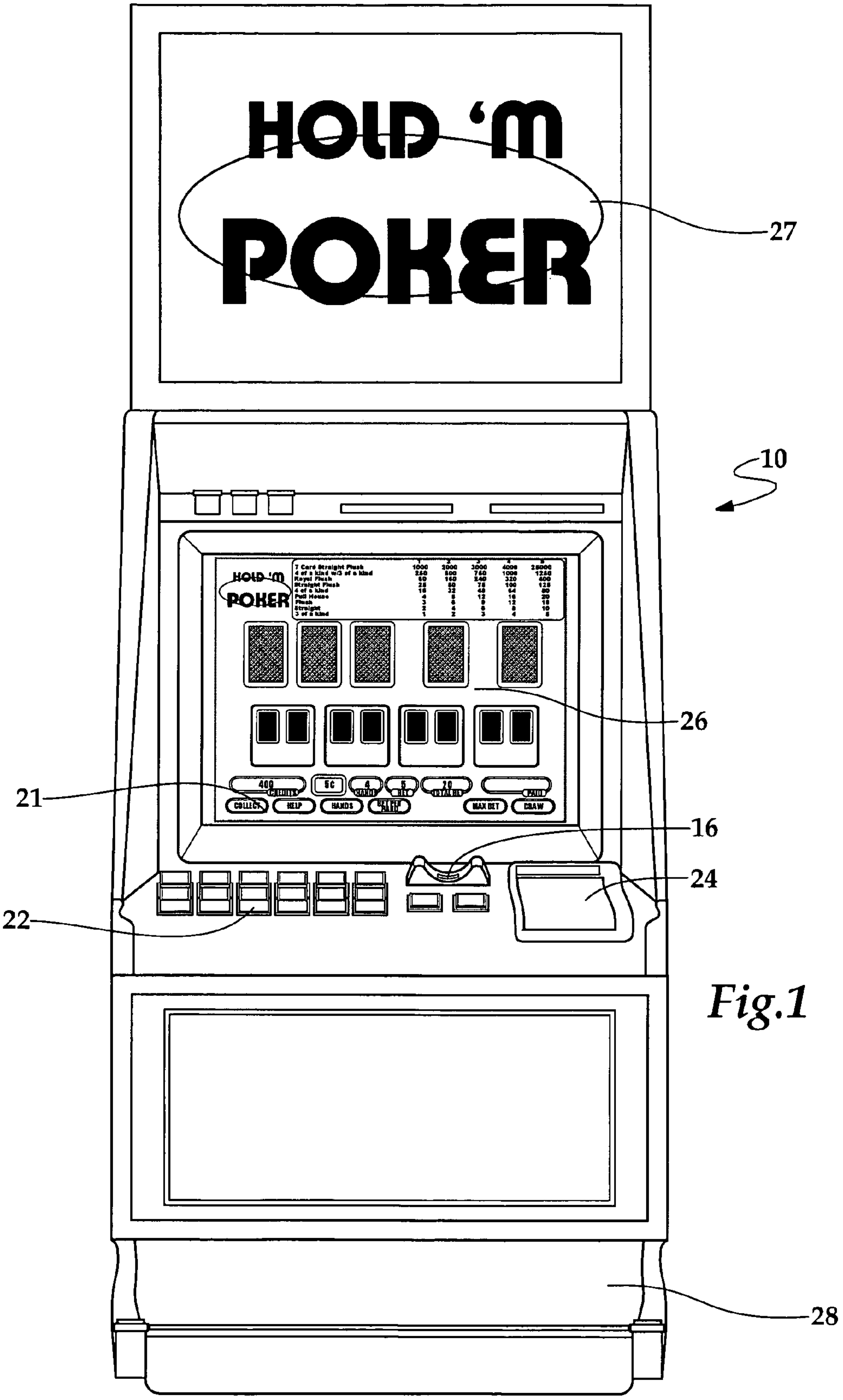
FIG. 1 is a perspective view of a gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Turning now to the drawings, FIG. 1 is a perspective view of a gaming terminal 10 according to one embodiment of the present invention. The gaming machine 10 is operable to conduct a wagering game, specifically a Texas Hold 'Em style video poker game. With regard to the present invention, the gaming terminal 10 may be any type of gaming terminal and may have varying structures and methods of operation.

The gaming terminal 10 includes input devices, such as a wager acceptor 16, a touch screen 21, a push-button panel 22, and a player-identification card reader 24. For outputs, the gaming terminal 10 includes a payout mechanism 23, a main display 26 for displaying information about a basic wagering game such as video poker and a secondary display 27 for displaying additional information, and an output receptacle (not shown) (coupled to the payout mechanism 23) for providing tokens or coins to the player when the player selects to cash out. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The wager acceptor 16 may include one or both of a coin slot acceptor or a currency note acceptor to input value to the gaming terminal 10. Additionally, the wager acceptor 16 may include a card-reading device for reading a card that has a recorded monetary value with which it is associated. The card may also authorize access to a central account, which can transfer money to the gaming terminal 10.

The payout mechanism 23 performs the reverse functions of the wager acceptor 16. For example, the payout mechanism 23 may include a coin dispenser or a note dispenser to output value from gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option of how to make their game selections. Alternatively, the push button panel 22 provides inputs for one aspect of operating the game, while the touch screen 21 allows for inputs needed for another aspect of operating the game.

The operation of the basic wagering game is displayed to the player on the main display 26. The main display 26 and the secondary display 27 may take the form of a cathode ray tube (CRT), a high resolution LCD, a plasma display, LED, or any other type of video display suitable for use in the gaming terminal 10. As shown, the main display 26 includes a touch screen 21 overlaying the entire monitor (or a portion thereof) to allow players to make game-related selections. Similarly, a touch screen may overlay the secondary display 27.

The player-identification card reader 24 allows for the identification of a player by reading a card with information indicating the player's true identity. Currently, the identification is used by casinos for rewarding certain players with complimentary services or special offers. For example, a player may be enrolled in the gaming establishment's players' club and may be awarded certain complimentary services as that player collects points in the player's player-tracking account. The player inserts the player's card into the player-identification card reader 24, which allows the casino's computers to register that player's wagering at the gaming terminal 10.

Figure 2:
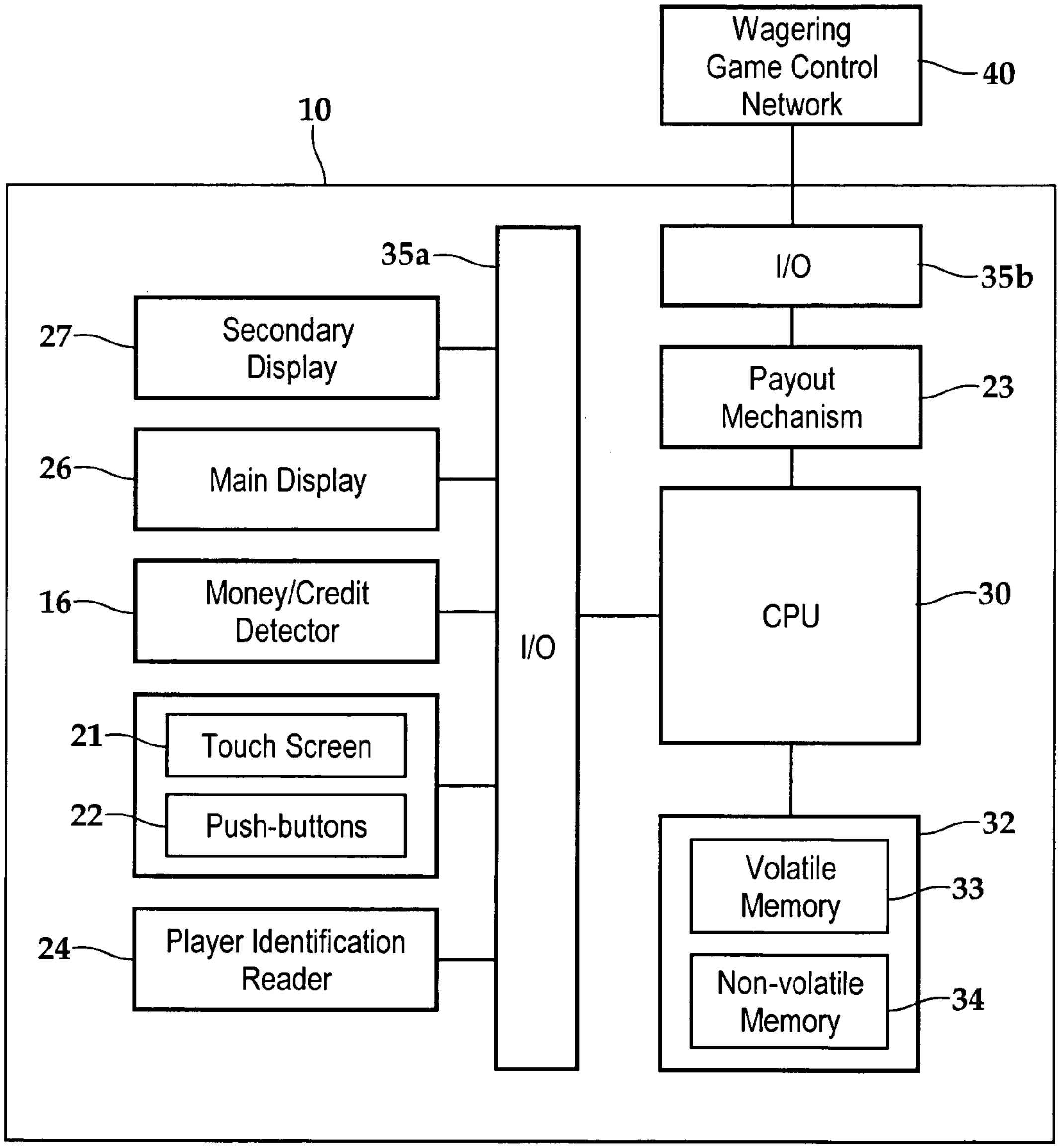
FIG. 2 illustrates a control system that is used in conjunction with the gaming terminal of FIG. 1.

Referring also to FIG. 2, the various components of the gaming terminal 10 are controlled by a central processing unit (CPU) 30, also referred to herein as a controller or processor (such as a microprocessor or microcontroller). The CPU 30 is also communicatively coupled to or includes a system memory 32. The system memory 32 may comprise a volatile memory 33 (e.g., a random-access memory, "RAM") and a non-volatile memory 34 (e.g., an EEPROM). To provide the gaming functions, the CPU 30 executes one or more game programs stored in a computer readable storage medium, in the form of the system memory 32. It should be appreciated that the CPU 30 may include one or more microprocessors. Similarly, the memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

The gaming terminal 10 is typically operated as part of a game control network 40 having control circuitry and memory devices, wherein a plurality of gaming terminals are coupled to the game control network 40. The game control network 40 can be the game controller that controls operation of the wagering game as described below. For example, instead of the CPU 30, the game control network 40 may determine the random outcomes for games conducted on the gaming terminal(s) 10. Alternatively, the CPU 30 randomly determines the game outcomes.

The gaming terminal 10 often has multiple serial ports, each port dedicated to providing data to a specific host computer system that performs a specific function (e.g., accounting system, player-tracking system, etc.). To set up a typical serial communication hardware link to the host system, the typical RS-232 point-to-point communication protocol that is often present in the gaming terminal 10 is converted to an RS-485 (or RS-485-type) master-slave protocol so as to take advantage of some of the benefits of the RS-485 capability (e.g., multi-drop capability that allows many gaming terminals 10 to communicate with the game control network 40). To perform this function, a custom interface board may be used by the gaming terminal 10 for each communication port in the gaming terminal 10. It should be noted that the gaming terminal 10 can initially be designed to be configured for a typical RS-485 protocol, instead of the typical RS-232 protocol. Further, the gaming terminal 10 may simply be designed for an Ethernet connection to the game control network 40.

Figure 3:
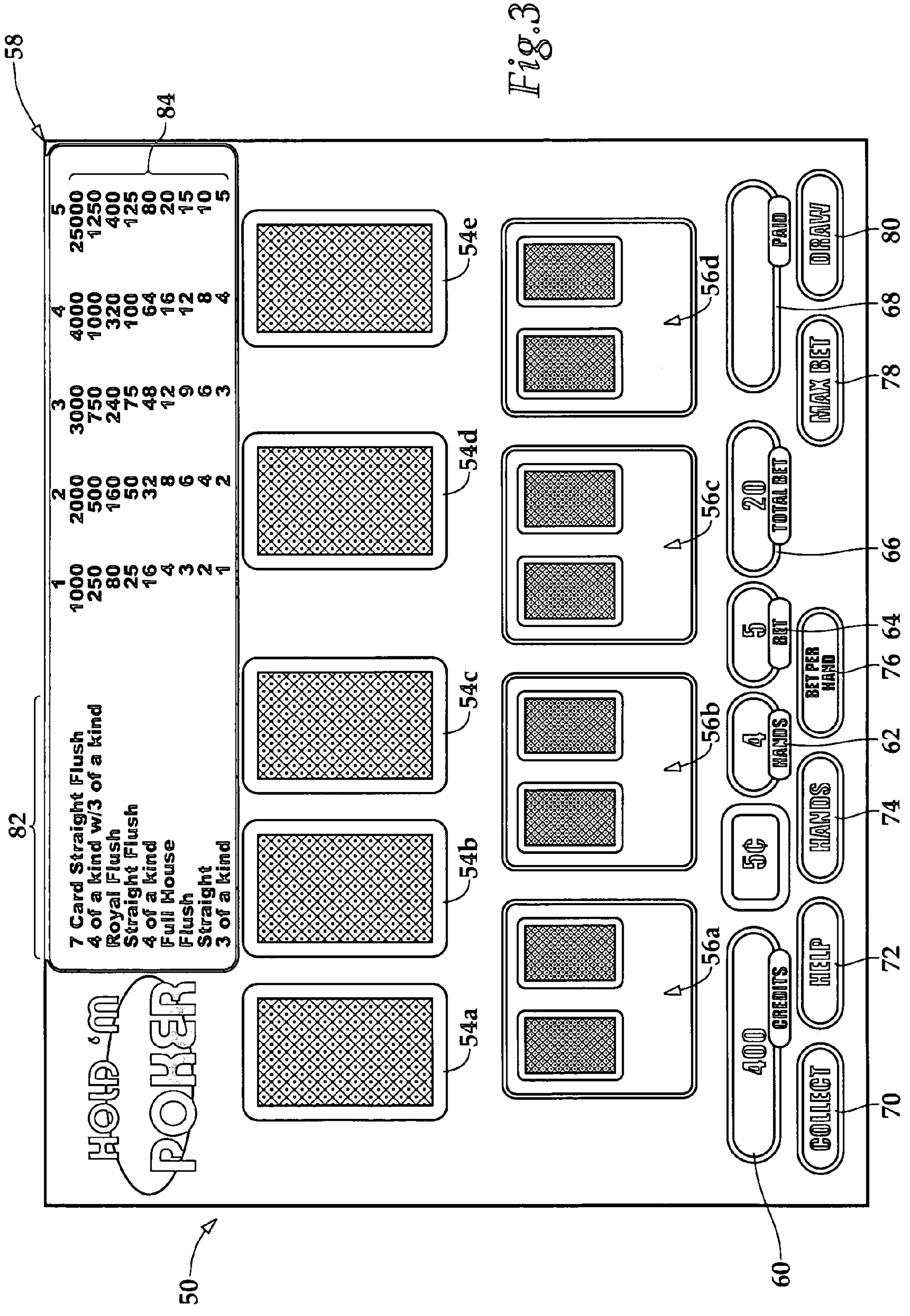
FIG. 3 is an image of a main poker game screen which may be displayed on the gaming terminal of FIG. 1, according to one embodiment of the present invention.

Referring now to FIG. 3, an image of a video poker game screen which can be displayed on the main video display 26 is illustrated, according to one embodiment of the present invention. A player begins play of the basic wagering game by inserting a wager input into the wager input accepter 16 of the gaming terminal 10. A player can select play by either using the touch screen 21 or push-button panel 22. The CPU 30, or the wagering game control network 40 in alternative embodiments, operates to execute a wagering game program causing the main video display 26 to display the wagering game that includes a plurality of visual elements.

According to one embodiment, a video poker game is preferably played with a single standard 52-card deck (i.e., Ace through King of four different suits). However, a poker game may be played with any number of decks and/or with a variety of different card compositions (e.g., wild cards, etc.). In the single standard deck embodiments, during a particular poker hand, all of the cards are dealt from the same deck. After a card is dealt from the deck into the poker hand, the card is "used up" and cannot appear again until the next poker hand. The deck may be replenished and randomly shuffled prior to every poker hand. The system memory 32 includes a data structure for storing data representing each card of the deck. The CPU 30 randomly selects cards for each poker hand from the data structure and controls the main video display 26 to display the cards.

It should also be understood that the above invention is not limited solely to one or more decks of cards and may be instituted by using any type of symbol-bearing objects, such as, for example, dice, tiles, chips, marbles, wheels, flipped coins, reels that are spun, etc.

An image of a video poker game screen prior to dealing a poker hand can be seen in FIG. 3. The main poker game screen 50 may be displayed on the main video display 26. In the illustrated embodiment, the main poker game screen 50 is used to display community cards 54*a-e*, user-playable hands 56*a-d*, a pay table 58, game session meters, and various buttons selectable by a player. The game session meters include a "credits" meter 60 for displaying a number of credits available for play on the machine; a "hands" meter 62 for displaying a number of hands to be played by a player on the machine; a "bet" meter 64 for displaying a number of credits wagered (e.g., from 1 to 5 credits) for each of the number of hands played; a "total bet" meter 66 for displaying a total number of credits wagered for the particular round of wagering; and a "paid" meter 68 for displaying an amount to be awarded based on the results of the particular rounds wager. The player-selectable buttons include a "collect" button 70 to collect the credits remaining in the credits meter 60; a "help" button 72 for viewing instructions on how to play the video poker game; a "hands" button 74 for changing the number of hands (displayed in the hands meter 62) a player wishes to play; a "bet per hand" button 76 for changing the amount of the wager which is displayed in the bet meter 64; a "max bet" button 78 for wagering a maximum number of credits (e.g., 5 credits); and a "draw" button 80 for causing the game to initially deal cards from a deck into the plurality of user-playable hands 56*a-d* face-up and to deal the community cards 54*a-e*.

The pay table 58, shown on the main display 26, may also or alternatively be displayed on the secondary screen 27. The pay table 58 includes a list of winning poker hand rankings 82 and a payout column 84 with payouts associated with each ranking. The number of credits won is linearly proportional to the number of credits wagered, except that a 7-card-straight flush yields a bonus when achieved on a maximum wager. The list of winning poker hand rankings 82 includes standard poker hand rankings beginning at 3 of a kind and including hands through a royal flush. Additionally, the list of winning poker hand rankings 82 includes two additional winning hands which are not standard to a traditional Texas Hold 'Em style game. These hands include a "4 of a kind w/3 of a kind" hand and a "7 card straight flush" hand. In this embodiment, it is possible for a player to utilize all of the community cards 54*a-e* and both of the cards located in a user-playable hand 56*a-d* to form a winning hand. In alternative embodiments, the winning poker hand rankings 82 may include one or more of the following hands: 7 card straight; 7 card flush; 6 card straight; 6 card flush; four or a kind with 1 pair; 3 of a kind with 3 of a kind; 2 pair; 1 pair; etc.

Figure 4:
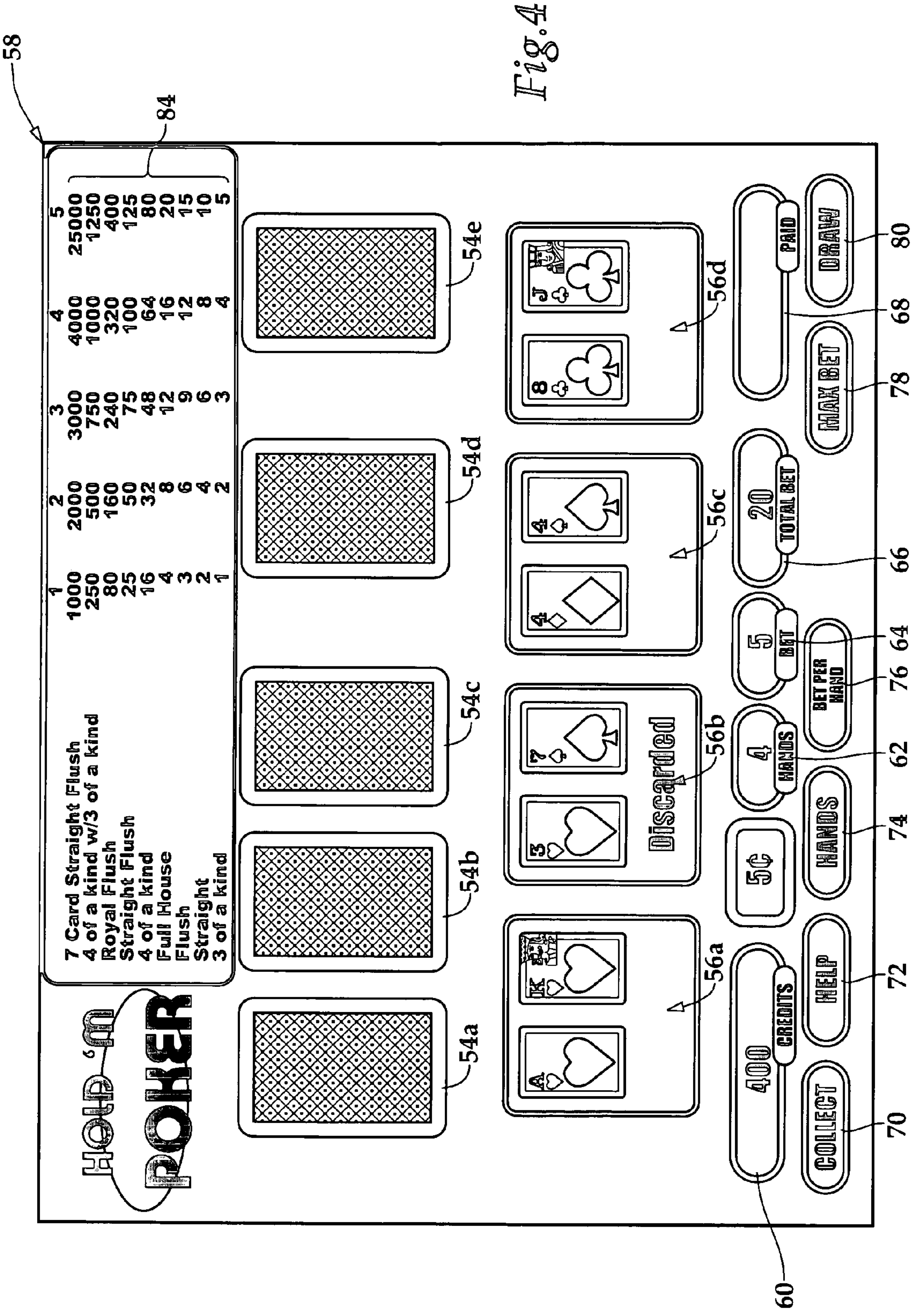
FIG. 4 is an image of a poker game screen after the user-playable hands have been displayed, according to one embodiment of the present invention.

As illustrated in FIG. 4, a player has selected to play four hands (displayed in hands meter 62) at five credits per hand (displayed in bet meter 64) for a total wager of twenty credits (displayed in total bet meter 66). By choosing to wager five credits for each of the user-playable hands 56*a-d*, the player is playing for the number of credits shown in the max bet column 86 displayed in the pay table 58.

By selecting the draw button 80, a player is able to view the four user-playable hands 56*a-d* they have wagered to play. According to one embodiment, a player selects a hand to discard prior to any of the community cards 54*a-e* being displayed. A hand is discarded by applying pressure to the touch screen 21 overlaying the hand to be discarded. Alternatively, a discard button may be provided beneath the hands which a user may select. In the illustrated example, a player has selected user-playable hand 56*b* to discard. Once a hand has been discarded by a player, the player is no longer able to collect on that hand and the player can then select the draw button 80 to display the first set of community cards 54*a-c* (i.e., the flop). Alternatively, the flop may be displayed once the player selects a hand to discard, without requiring a user to further select the draw button 80.

Figure 5:
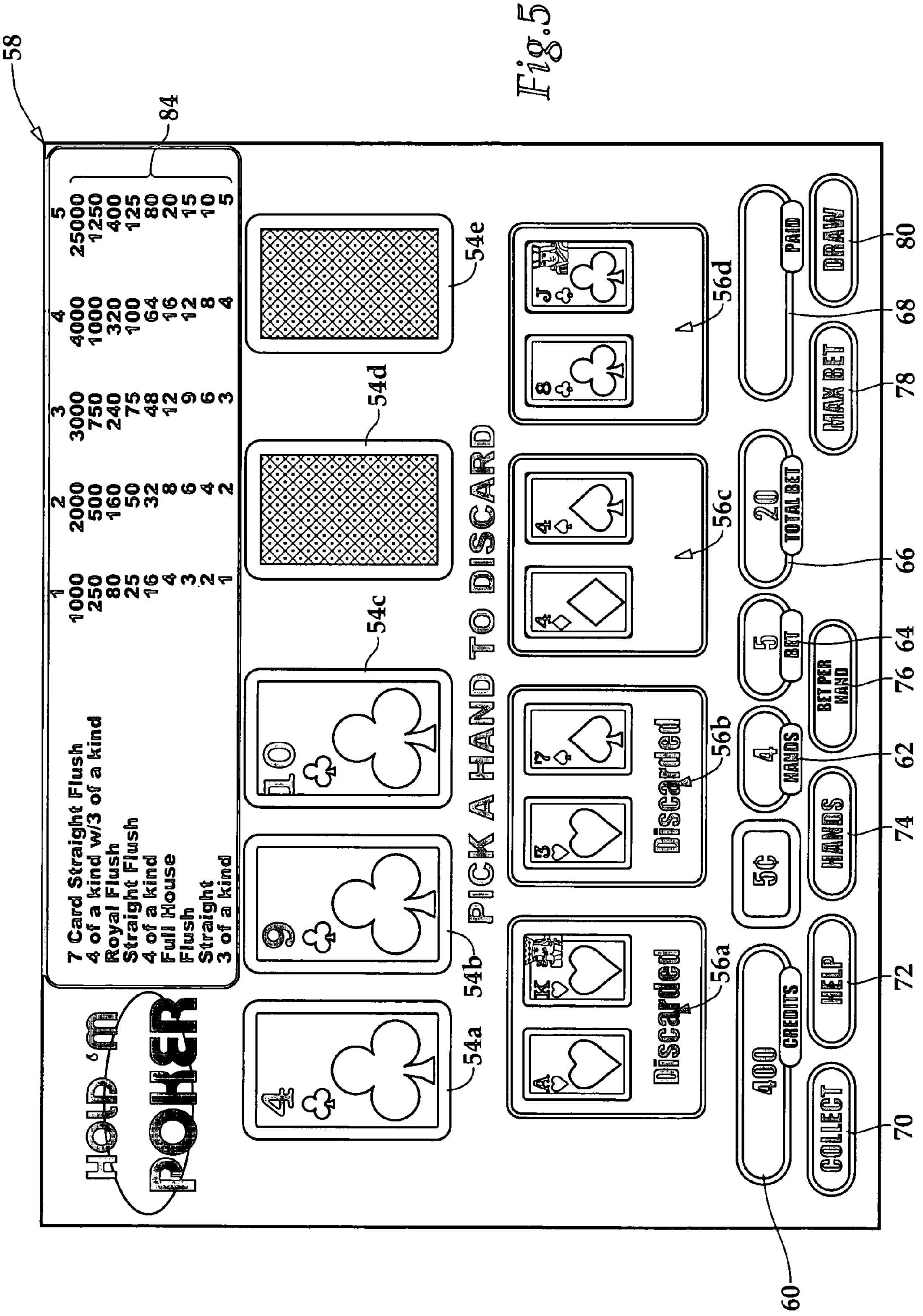
FIG. 5 is an image of a poker game screen after the flop has been displayed, according to one embodiment of the present invention.

As illustrated in FIG. 5, once the flop has been displayed and cards 54*a-c* are able to be viewed by a player, the player is prompted to discard an additional hand of the originally displayed user-playable hands 56*a-d*. In the illustrated example, the player has chosen to discard user-playable hand 56*a*. Thus, user-playable hands 56*c* and 56*d* are still available for the player to collect a payoff if a winning hand is formed. Once the additional hand has been discarded, the player can select the draw button 80 to display the next community card 54*d* or the next community card 54*d* can be automatically displayed upon the selection of the second discard hand.

Figure 6:
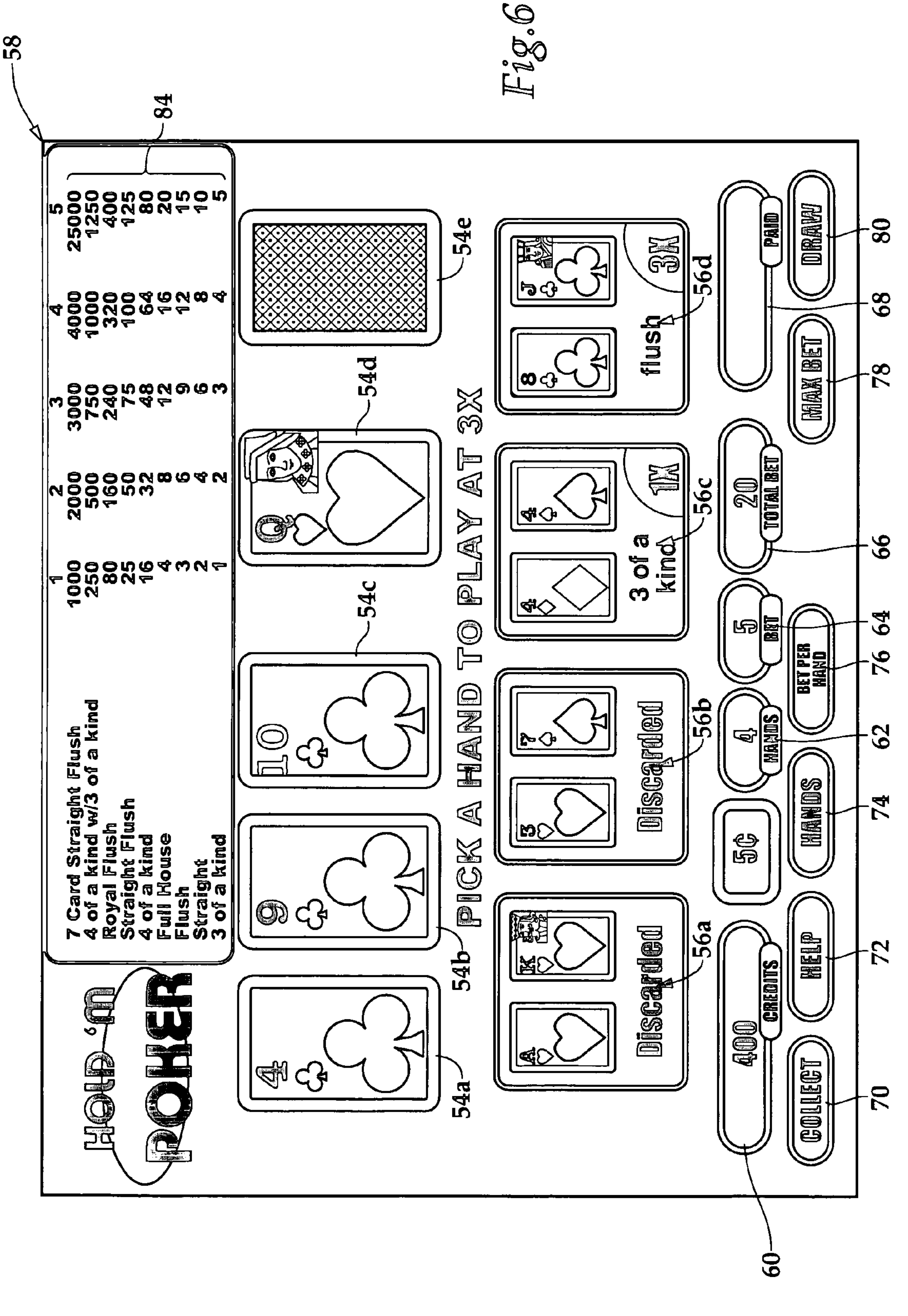
FIG. 6 is an image of a poker game screen after the turn card has been displayed, according to one embodiment of the present invention.

According to one embodiment, once the fourth community card (e.g., the turn card, fourth street, etc.) has been displayed, as illustrated in FIG. 6, a player is prompted to select a preferred hand to play at three times the payoff value for the hand. As such, for example, if the payoff value for a straight flush on a five credit bet is 125 credits, by selecting the hand as the preferred hand, the player would receive a payoff of 375 credits. In this embodiment, the player's initial wager of five credits for each of the four hands is consolidated into a bet of fifteen credits for the preferred hand and five credits for the non-preferred hand. Thus, even though the player has discarded two undesired hands, the player's entire wager is still in play until the end of the round. In the illustrated example, the player has selected the fourth user-playable hand 56*d* as the preferred hand.

Figure 7:
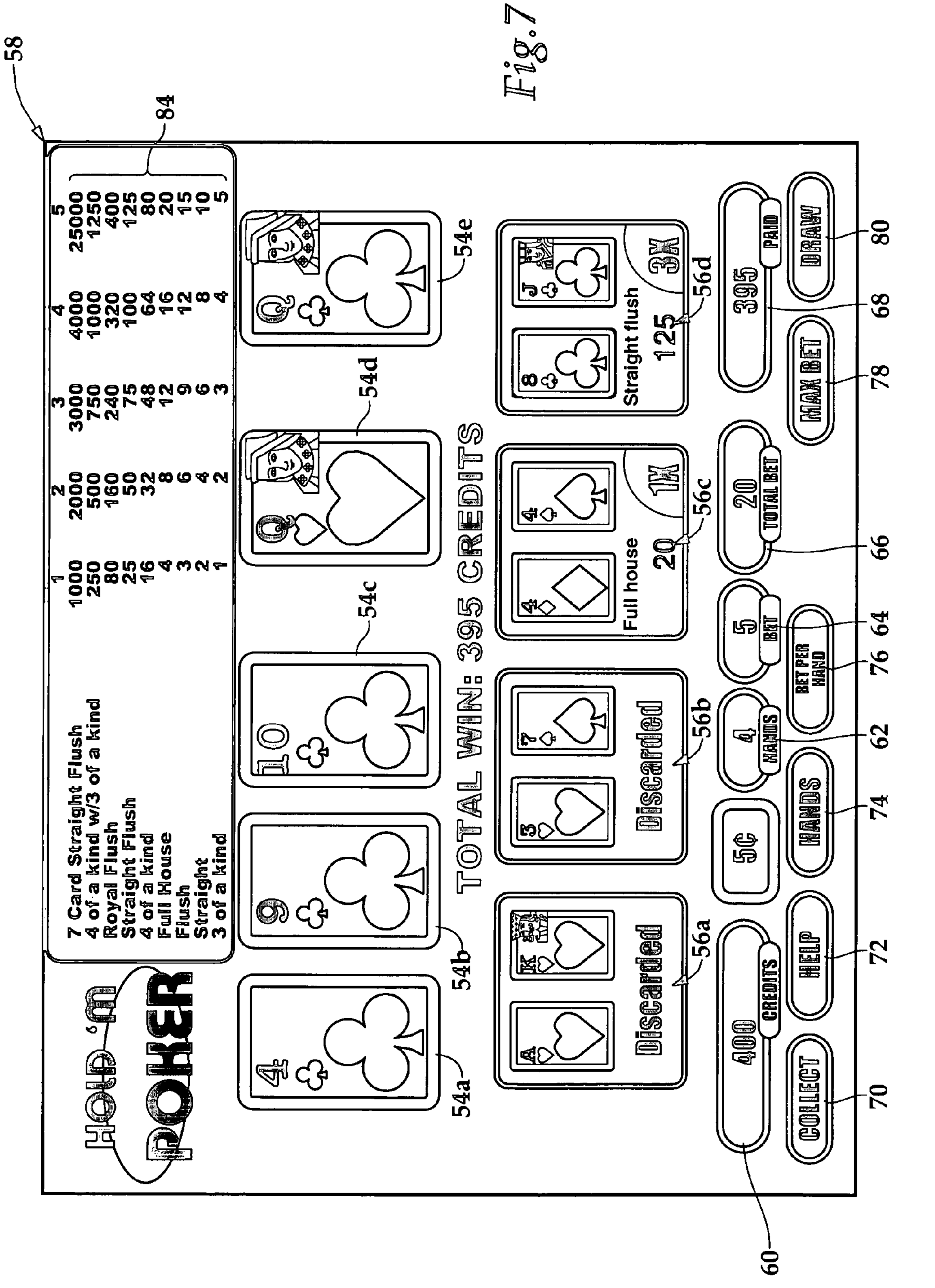
FIG. 7 is an image of a poker game screen after the river has been displayed and a payoff has been awarded, according to one embodiment of the present invention.

As illustrated in FIG. 7, the fifth community card 54*e* (i.e., the river) is displayed once the player has selected the preferred hand. After the fifth community card 54*e* has been displayed, the CPU 30 (FIG. 2) determines a poker hand ranking of each of the remaining user-playable hands 56*c-d*. The poker hand ranking is determined for each of the individual best hands, which are created when each of the remaining user-playable hands 56*c-d* are combined with the five community cards 54*a-e*. In the illustrated example, the individual best hand formed by combining the user-playable hand 56*c* with the community cards 54*a-e* is a full house, while the preferred individual best hand formed by combining the preferred user-playable hand 56*d* with the community cards 54*a-e* is a straight flush.

Once the individual best hands have been determined, a player is awarded a primary payoff as displayed in the pay table 58 if the ranking of the hands meets the predetermined criteria displayed in the pay table 58. In the illustrated example, the player is awarded a primary payoff of twenty credits as displayed in the payout column 84 of the pay table 58 for the full house with a five credit wager. Also in the illustrated example, the player is awarded a primary payoff of 125 credits as displayed in the payout column 84 of the pay table 58 for the straight flush with a five credit wager. However, because the straight flush was selected by the player as the preferred hand, the 125 credit primary payoff is increased (or multiplied) by a factor of three and a 375 credit payoff is awarded to the player. The 395 credit total payoff for the two individual best hands is displayed in the paid meter 68.

Figure 8:
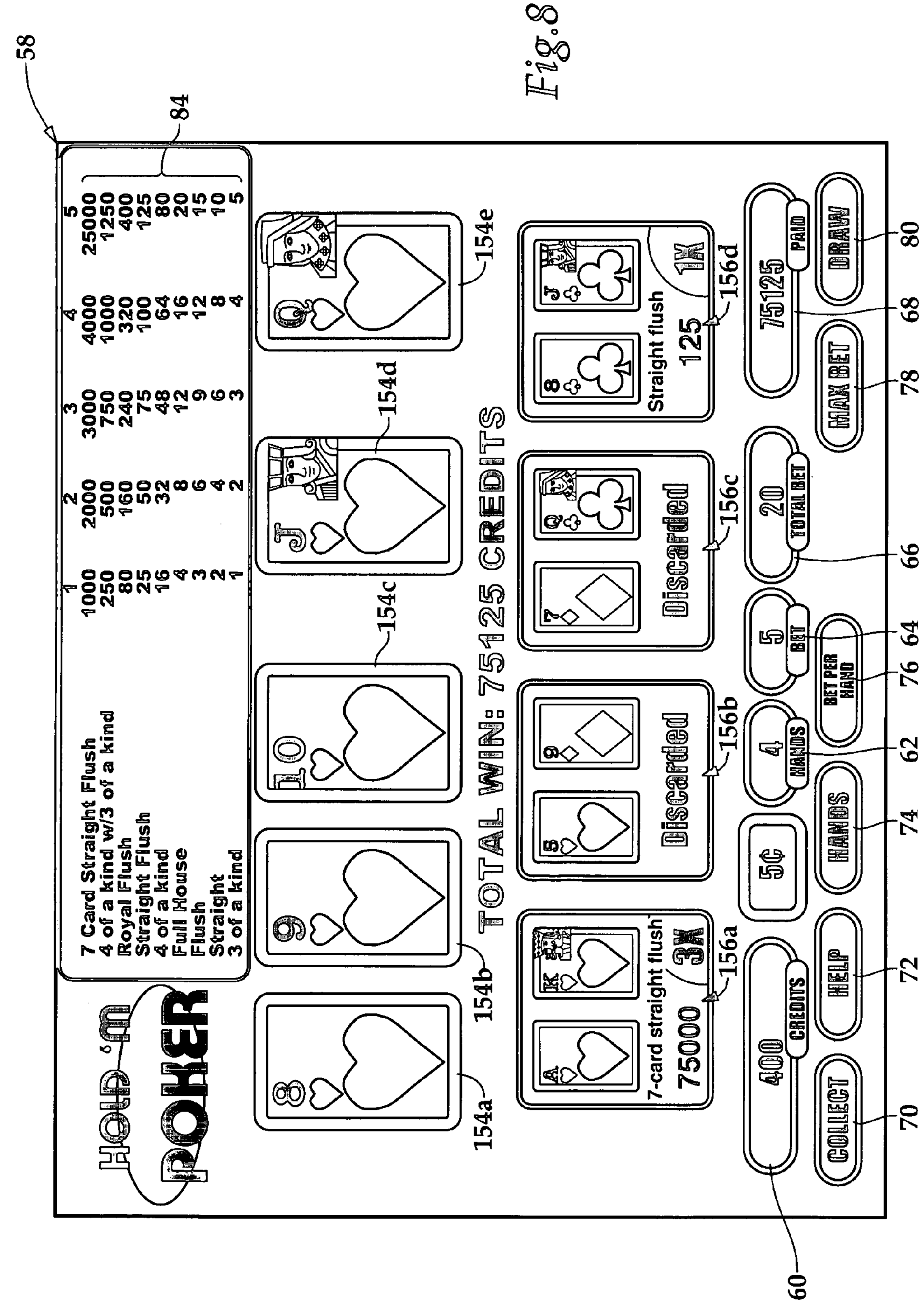
FIG. 8 is another image of a poker game screen after the river has been displayed and a payoff has been awarded, according to one embodiment of the present invention.

Another example of the payoff for a completed video poker game is illustrated in FIG. 8. In this example, the player has again wagered five credits on each of the four user-playable hands 156*a-d*. The player has previously discarded user-playable hands 156*b-c* and has previously selected user-playable hand 156*a* as the preferred hand. Thus, the player is awarded a primary payoff of 125 credits for the individual best hand of a straight flush created by combining the community cards 154*a-e* with the user-playable hand 156*d*. Additionally, the player is awarded an increased payoff of 75,000 credits for the preferred individual best hand of a 7-card straight flush.

Though the above examples have illustrated five community cards and four user-playable hands, it should be apparent that the present invention is not limited only to such embodiments. For example, any number of user-playable hands may be displayed for a player to wager upon. In one embodiment, for example, the player is dealt two user-playable hands initially and then selects which one of the two user-playable hands to discard. The player then proceeds to play the one non-discarded user-playable hand. The number of user-playable hands is only limited by the number of cards which comprise the deck to be displayed. Where a larger number of user-playable hands are desired, a plurality of decks of cards may be combined to form the desired hands. Additionally, any number of community cards may be displayed so long as a player is provided at least one opportunity to discard a hand prior to the final community card being displayed.

Additionally, although the preferred award has been illustrated as a 3× multiple of the primary payoff amount, any increase of the primary payoff amount may be awarded. For example, the primary payoff may be multiplied by any integer to form an increased payoff amount. Alternatively, the increased payoff could be in the form of a bonus game, an additional prize or award, or any other payoff greater than the displayed primary payoff.

It should be understood that the above invention is not limited to a video poker system and may be instituted on a standard casino table or another means sufficient to conduct the above described wagering game.

Figure 9:
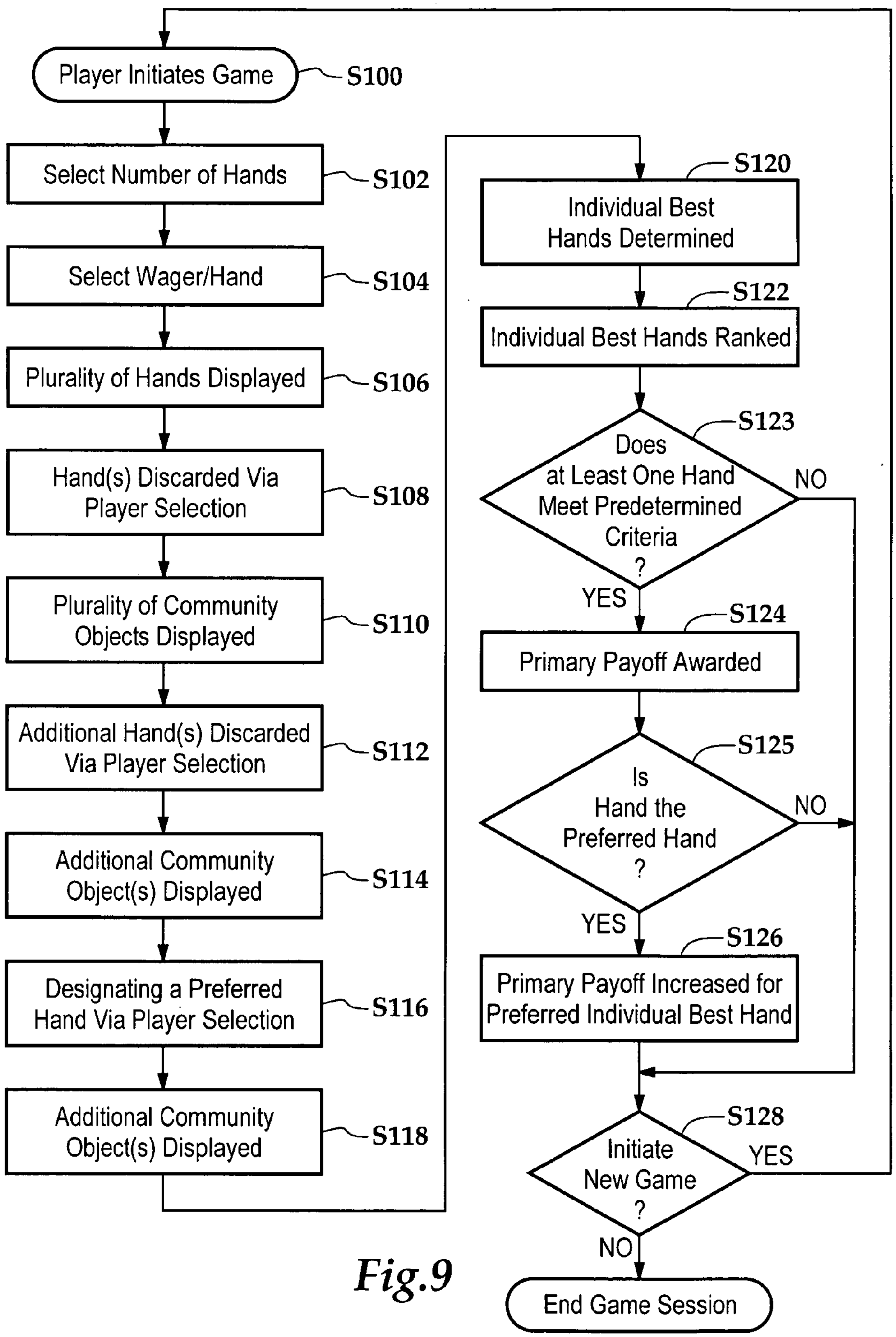
FIG. 9 is a flow diagram detailing a method of operation for a wagering game, according to one embodiment of the present invention.

Turning now to FIG. 9, the operation detailing the method of playing the game according to the illustrated embodiment of the invention will be described. In step s100, a player at the gaming terminal 10 begins a gaming session by any conventional method (e.g., inserting coins or using credits). The player then selects a number of hands to play at step s102 and also selects an amount to wager for each of the selected number of hands at step s104. Once the total wager has been made by the player, a plurality of user-playable hands are displayed at step s106. According to one embodiment, the plurality of user-playable hands comprise a plurality of symbol-bearing objects.

After the plurality of user-playable hands have been displayed, at least one hand is discarded via player selection at step s108 to create a reduced plurality of user-playable hands. A plurality of community symbol-bearing objects are then displayed at step s110 after the reduced plurality of user-playable hands has been created. At step s112, at least one additional hand is discarded, via player selection, to create a further-reduced plurality of user-playable hands. At least one additional community symbol-bearing object is then displayed at step s114.

A preferred user-playable hand is designated at step s116 via player selection and at least one additional community symbol-bearing object is displayed at s118. Each hand of the further-reduced plurality of user-playable hands is then combined with the community symbol-bearing objects to form individual best hands at step s120. The individual best hands are then ranked at step s122. At decision box s123, a determination is made as to whether at least one of the individual best hands meets a predetermined criteria (e.g., a pay table). If none of the individual best hands meets the criteria, a player is prompted to initiate a new game at step s128. If at least one of the individual best hands meets the criteria, a primary payoff is awarded—at step s124—to each of the hands that meets the criteria.

Once at least one primary payoff has been awarded a determination is made—at decision box s125—as to whether a hand awarded a primary payoff was a preferred hand. If the hand awarded the primary payoff was not a preferred hand, a player is prompted to initiate a new game at step s128. If, however, the preferred individual best hand meets the predetermined criteria, the primary payoff may be increased at step 126, thus, a player would receive an extra payoff, additional prize, etc. An awarded payoff (where the payoff is credits) can then be used to initiate another game, step s128, or can be collected by the player.

While the present invention has been described with reference to one or more particular embodiments, those skilled in the art will recognize that many changes may be made thereto without departing from the spirit and scope of the present invention. Each of these embodiments and obvious variations thereof is contemplated as falling within the scope of the claimed invention, which is set forth in the following claims.

What is claimed is:

1. A method of conducting a wagering game, comprising:

receiving a wager for a plurality of user-playable hands;

providing a plurality of cards to form the plurality of user-playable hands;

discarding, via player selection, at least one of the plurality of user-playable hands, creating a reduced plurality of user-playable hands, the reduced plurality of user-playable hands including at least two user-playable hands;

providing a plurality of community cards;

after providing the plurality of community cards, discarding, via player selection, at least a second one of the plurality of user-playable hands to create a further-reduced plurality of user-playable hands, wherein each of the further-reduced plurality of user-playable hands is capable of being combined with the plurality of community cards to form a plurality of individual best hands; and allocating the entire received wager to the further-reduced plurality of user-playable hands.

2. The method of claim 1 further comprising awarding a player a payoff for each of the individual best hands meeting a predetermined criterion.

3. The method of claim 1 further comprising providing a player with the ability to select a preferred hand from the further-reduced plurality of user-playable hands.

4. The method of claim 3, wherein a preferred individual best hand is created by combining the cards of the preferred hand with the plurality of community cards.

5. The method of claim 4 further comprising awarding the player a primary payoff for each of the plurality of individual best hands, the primary payoff being based on a pay table containing payoff amounts.

6. The method of claim 5 further comprising increasing the primary payoff for the preferred individual best hand by applying a multiplier to the associated payoff amount contained in the pay table.

7. The method of claim 1, wherein the plurality of user-playable hands and the plurality of community cards are dealt from a deck including at least 52 standard playing cards.

8. The method of claim 7, wherein the playing cards are combined to form poker hands.

9. The method of claim 7, wherein the playing cards are combined to form seven-card poker hands.

10. A method of conducting a wagering game, comprising:

receiving a wager for a plurality of user-playable hands;

revealing a plurality of symbol-bearing objects to form the plurality of user-playable hands;

revealing at least one community symbol-bearing object; and after revealing the at least one community symbol-bearing object, discarding, via player selection, at least one hand from the plurality of user-playable hands, creating a reduced plurality of user-playable hands; and wherein the at least one community symbol-bearing objects is capable of being combined with each of the reduced plurality of user-playable hands to form an individual best hand; and allocating the entire received wager to the reduced plurality of user-playable hands.

11. The method of claim 10, the plurality of community symbol-bearing objects being capable of being combined with one or more of the reduced plurality of user-playable hands to form one or more individual best hands.

12. The method of claim 11, further comprising:

discarding, via a second player selection, at least a second hand from the plurality of user-playable hands to form a further-reduced plurality of user-playable hands; and revealing an additional community symbol-bearing object, wherein the additional community symbol-bearing object is capable of being combined with the first plurality of community symbol-bearing objects to form a second plurality of community symbol-bearing objects, and wherein the second plurality of community symbol-bearing objects is capable of being combined with each of the further-reduced plurality of user-playable hands to form one or more individual best hands.

13. The method of claim 12 further comprising awarding a player a payoff based on a ranking of the one or more individual best hands in response to the one or more of the individual best hands meeting a predetermined criterion.

14. The method of claim 13, wherein the predetermined criterion is a plurality of hand rankings contained in a pay table.

15. The method of claim 13 further comprising providing the player with the ability to select a preferred hand from the further-reduced plurality of user-playable hands.

16. The method of claim 15 further comprising revealing another additional community symbol-bearing object, prior to awarding the player a payoff, wherein the another additional community symbol-bearing object is capable of being combined with the second plurality of community symbol-bearing objects to form a third plurality of community symbol-bearing objects, and wherein the third plurality of community symbol-bearing objects is capable of being combined with one or more of the further-reduced plurality of user-playable hands to form one or more individual best hands.

17. The method of claim 16, wherein any awarded payoff earned by the preferred hand is increased.

18. The method of claim 16, wherein the third plurality of community symbol-bearing objects are five community symbol-bearing objects and wherein each of the plurality .of user-playable hands comprise two symbol-bearing objects.

19. The method of claim 10, the symbol-bearing objects being playing cards, the plurality of user-playable hands and the community symbol-bearing objects being dealt from a deck including at least 52 standard playing cards.

20. The method of claim 10, wherein the plurality of user-playable hands are two user-playable hands and the reduced plurality of user-playable hands is a single user-playable hand.

21. A computer readable storage medium encoded with instructions for directing a gaming terminal to perform the method of claim 10.

* * * * *